United States Patent [19]

Hartley et al.

[11] Patent Number: 4,684,332

[45] Date of Patent: Aug. 4, 1987

[54] RATIO PUMP AND METHOD

[75] Inventors: E. Dale Hartley, Malibu; F. Scott Hartley, Camarillo, both of Calif.

[73] Assignee: Product Research and Development, Fullerton, Calif.

[21] Appl. No.: 797,620

[22] Filed: Nov. 13, 1985

[51] Int. Cl.[4] .............................................. F04B 11/00
[52] U.S. Cl. ...................................... 417/397; 91/265; 91/341 R; 91/346; 91/350
[58] Field of Search ............... 417/393, 397, 403, 404; 91/265, 341, 346, 350; 92/59

[56] References Cited

U.S. PATENT DOCUMENTS

| | | | |
|---|---|---|---|
| 2,945,444 | 7/1960 | Leissner | 417/454 X |
| 3,070,023 | 12/1962 | Glasgow | 417/397 |
| 3,556,688 | 1/1971 | Hammelmann et al. | 417/397 |
| 4,119,113 | 10/1978 | Meginniss, III | 417/397 X |
| 4,354,806 | 10/1982 | McMillin et al. | 417/393 |

Primary Examiner—Leonard E. Smith
Attorney, Agent, or Firm—Gordon L. Peterson

[57] ABSTRACT

A ratio pump for delivering first and second liquid beverage components in a desired ratio comprising a motor and a pump driven by the motor. The first beverage component is pressurized and is used as the driving fluid for the motor. The second beverage component is pumped by the pump. The first beverage component is exhausted from the motor and delivered along with a second beverage component delivered by the pump. The motor, which may include a piston, requires a predetermined amount of the first beverage component in order to drive the pump to deliver a known volume of the second beverage component.

13 Claims, 6 Drawing Figures

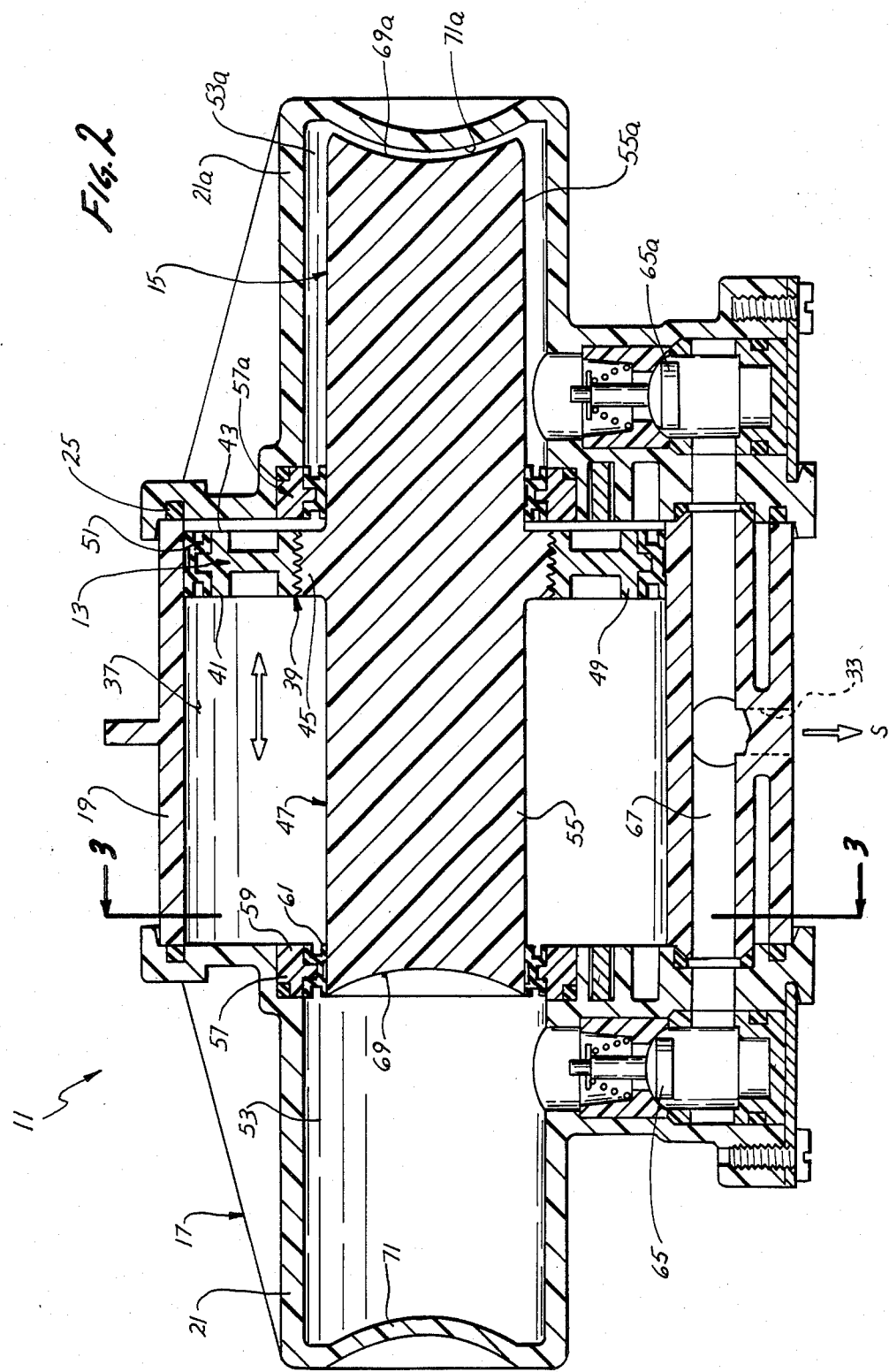

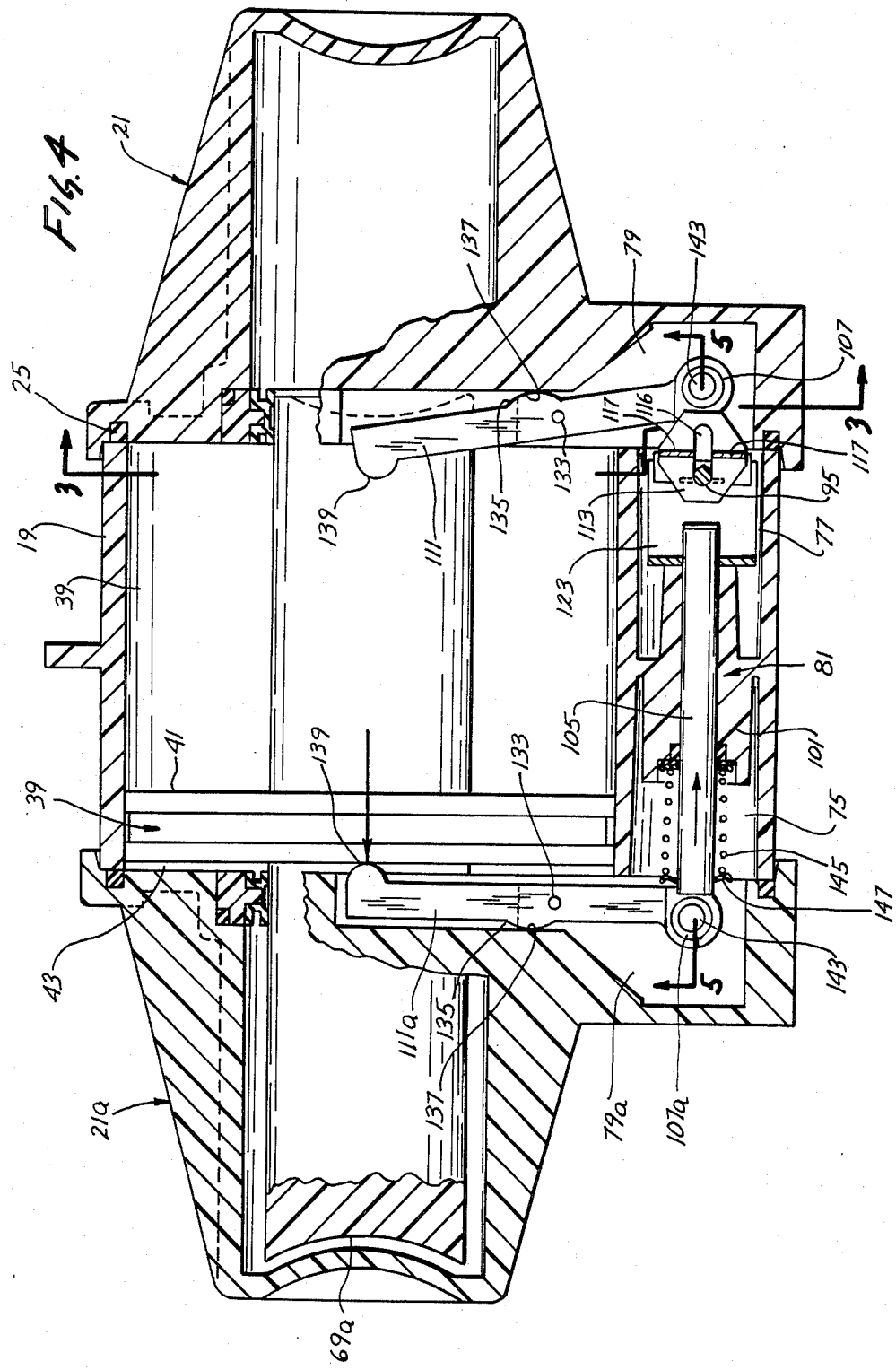

RATIO PUMP AND METHOD

BACKGROUND OF THE INVENTION

Many beverages comprise multiple liquid components, such as water and a syrup or a concentrate. The water may or may not be carbonated, and the syrup may be, for example, a soft drink syrup, and the concentrate may be, for example, a fruit juice or tea concentrate. The beverage components are typically mixed as the beverage is dispensed at the serving facility. In order to have a beverage with the desired taste, it is very important that the beverage components be mixed in the correct ratio.

In a conventional system, the water and syrup or concentrate are provided through separate proportioning valves to a dispensing outlet. The valves must be initially carefully set to establish the desired ratio and then should be re-adjusted daily to maintain the correct ratio. The syrup or concentrate is pumped to its proportioning valve by a pump driven by carbon dioxide gas.

This conventional system has experienced numerous problems. For example, the valve-adjusting process is time-consuming, and the valve re-adjusting process may not be carried out frequently enough to maintain the desired ratio. Furthermore, even if the valves are correctly adjusted, pressure changes in either of the beverage components furnished to the valves results in the dispensing of a beverage having the incorrect ratio of components. Also, fibrous concentrates, such as juice concentrates containing pulp, tend to foul the concentrate proportioning valve. Finally, the pumping of the syrup or concentrate with carbon dioxide gas is wasteful in that the gas is exhausted to the atmosphere after it is used by the pump.

SUMMARY OF THE INVENTION

This invention solves the problems described above with the conventional system. Thus, this invention eliminates the proportioning valves of the prior art, along with the attendant problems of valve adjustment and valve fouling by the concentrate. This invention provides the desired ratio of beverage components even if line pressure should vary and does not require or waste carbon dioxide gas for the pumping of the concentrate or syrup. Although this invention is applicable to the delivery of multiple liquid components generally, it is particularly adapted for use with beverage components and is described with respect thereto.

In a typical beverage, the water component is usually supplied at a positive pressure. This invention uses the pressurized component, which is typically the water component, as the source of power for a motor which drives a pump that pumps the other beverage component. After being used as the driving fluid, the pressurized component is then exhausted for ultimate delivery along with the pumped component for use in the beverage. Accordingly, one of the beverage components is used as the source of power for pumping the other of the components.

To assure that the desired ratio is maintained, it is important to employ a motor which utilizes a fixed volume of water in causing the pump to pump a fixed volume of the pumped component. By so doing, the volume of water exhausted from the motor will always bear a predetermined relationship to the volume of the pumped component delivered by the pump.

Although different constructions are possible, the motor can advantageously include a motor chamber and a reciprocable member which can be driven through strokes of a predetermined length in the motor chamber. Similarly, the pump can advantageously include a pumping chamber and a reciprocable pumping member which can be driven through strokes of predetermined length in the pumping chamber. Accordingly, the ratio of motor exhaust to pump delivery will equal the ratio of the areas of the working faces of the reciprocable members of the motor and pump, respectively. A fixed ratio of the beverage components is delivered even if supply pressures of the beverage components to the motor and/or pump should change.

With this construction, the beverage component ratio is fixed. However, the ratio can be changed to a new fixed ratio. This can be accomplished, for example, by providing a removable seal gland for sealingly cooperating with the reciprocable pumping member. The seal gland and the pumping member can then be replaced to provide a pumping member having a larger or smaller area to thereby change the ratio.

The reciprocable members can be of a variety of constructions and may be, for example, a diaphragm or piston. However, a piston or other rigid member is preferred because it provides greater volumetric accuracy.

The motor exhaust and the delivery of the pump are fed into a receiver, either with the pump itself or downstream thereof, so that the beverage components can mix. For example, the receiver may include first and second conduits leading, respectively, from the motor exhaust and the pump outlet and a common discharge conduit joined to the first and second conduits. With this invention, the conduit leading from the pump outlet is devoid of any shutoff valve so that it is incapable of shutting off flow of the pumped component. This is important as a safety measure to assure that this region of the conduit and pump cannot be overpressurized. This is particularly important because a typical ratio of the pressurized water to concentrate is 5.5 to 1, and accordingly, the concentrate is delivered at, in this example, 5.5 times the pressure of the water. It is, therefore, desirable to assure that overpressurizing of the pump and its discharge line is not likely to occur.

In a preferred construction, the ratio pump of this invention includes a housing, and the reciprocable members of the pump and motor are coaxially coupled within the housing. To obtain pump delivery on each stroke of the pump, the pump preferably has first and second pumping chambers which are preferably located at the opposite ends of the motor chamber and first and second plungers coupled to the motor piston for reciprocating within the first and second pumping chambers, respectively.

In order that the reciprocable member of the motor can reciprocate, it is necessary to switch the opposite working faces of the reciprocable member between an inlet for admitting driving fluid under pressure and an exhaust for exhausting the driving fluid under pressure from the chamber. This is accomplished by valve means which control the admission and exhaust of the liquid component into, and from, the motor chamber, respectively, and means for controlling the valve means so that the liquid component can reciprocate the reciprocable member. This invention also provides novel controlling means which can be used with the ratio pump of this invention, or with various reciprocating devices, such as motors and compressors, where a switching action of valves is required.

For example, the controlling means can advantageously include bistable spring means for operating the valve means and driving means for driving the bistable spring means over center in both directions. The driving means may include first and second pivotally mounted levers at opposite ends of the motor chamber which are pivotable by the reciprocable member as it nears the ends of its strokes to control the valve means.

The invention, together with additional features and advantages thereof, may best be understood by reference to the following description taken in connection with the accompanying illustrative drawings.

BRIEF DESCRIPTION OF THE DRAWINGS

FIG. 2 is a sectional view taken generally along line 2—2 of FIG. 1.

FIG. 4 is a sectional view taken generally along line 4—4 of FIG. 3.

DESCRIPTION OF THE PREFERRED EMBODIMENT

Figure 1:
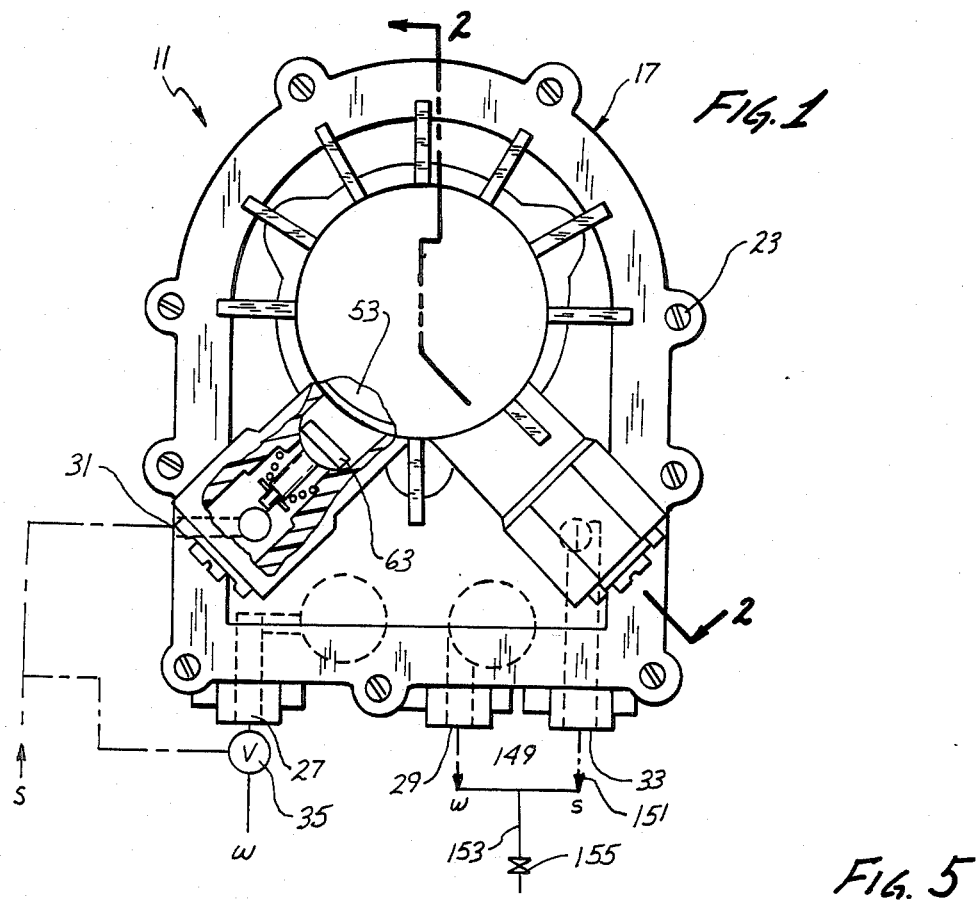
FIG. 1 is an end elevational view partially in section of a ratio pump constructed in accordance with the teachings of this invention.

The drawings show a ratio pump 11 which generally comprises a motor 13 (FIG. 2) and a pump 15. The ratio pump 11 includes a housing 17 which, in this embodiment, includes a central housing section 19 (FIG. 2) and identical end housing sections 21 and 21a, all of which are molded of a suitable plastic material. The housing sections 19, 21, and 21a are suitably interconnected as by threaded fasteners 23 (FIG. 1) and sealed together in any suitable manner as by a seal 25.

As shown in FIG. 1, the housing 17 has a water inlet 27, a water outlet or exhaust 29, a syrup inlet 31 and a syrup outlet 33. Of course, the inlets 27 and 31 and the outlets 29 and 33 can be connected to various different liquids. However, in this embodiment, the ratio pump 11 is described with reference to ratioing of the beverage components of a beverage which comprises a soft drink syrup and a pressurized source of carbonated water. If desired, the water can be provided through a valve 35 which automatically shuts off when the supply of syrup is exhausted. For example, the valve 35 may be a vacuum-operated valve which is coupled to the syrup inlet 31 so that it can sense the vacuum pressure that exists when the supply of syrup is used up.

The motor 13 includes a motor chamber or cylinder 37 (FIG. 2) and a reciprocable member in the form of a double-acting piston 39 having opposed working faces 41 and 43. The piston 39 includes a flange 45 integral with a plunger 47 of plastic material, a main body or disc 49 and a seal 51 molded directly onto the periphery of the disc 49 in a process which does not require a separate bonding agent. The disc 49 may be threaded onto the flange 45, and the piston 39 and the plunger 47 are coaxial. The body 49 and the plunger 47 are constructed of plastic or other suitable material.

In operation, the piston 39 is reciprocated in the cylinder 37 by the pressurized carbonated water from the water inlet 27 with each stroke of the piston requiring a predetermined volume of the pressurized water. A preferred manner of reciprocating the piston 39 is described hereinbelow.

The pump 15 includes indentical pumping chambers 53 and 53a and a reciprocable member in the form of plungers or plunger sections 55 and 55a which are reciprocable in the pumping chambers 53 and 53a, respectively. A seal gland 57 which includes a relatively rigid ring 59 and a seal 61 molded directly onto the inner periphery of the ring 59 in a manner that does not require the use of a separate bonding agent is removably attached in any suitable manner, such as by screws 60 (FIG. 3), to the housing section 21 to form an inner end of the pumping chamber 53. An identical removable seal gland 57a is provided for the pumping chamber 53a.

As shown in FIG. 2, syrup is admitted to the pumping chamber 53 on the intake stroke, i.e., when the plunger 55 moves to the right as viewed in FIG. 2, through an inlet check valve 63 (FIG. 1), which may be of conventional construction. Similarly, syrup is discharged from the pumping chamber 53 on the discharge stroke, i.e., when the plunger 55 moves to the left as viewed in FIG. 2, through an outlet check valve 65. The pumping chamber 53a has an inlet check valve (not shown) identical to the inlet check valve 63 and an outlet check valve 65a. As shown in FIG. 2, the discharge from both of the outlet check valves 65 and 65a is supplied to a header 67 which discharges to the syrup outlet 33 as shown in FIG. 2.

The plungers 55 and 55a, which, in the illustrated embodiment, form portions of the plunger 47, have identical working faces 69 and 69a, and it is apparent that the volume of syrup pumped by each of the pumping chambers 53 and 53a is directly proportional to the areas of the associated working face. In this embodiment, the area of each of the working faces 41 and 43 of the piston 39 is 5.5 times as great as the area of each of the working faces 69 and 69a. Consequently, on each stroke of the piston 39, the ratio of water exhausted to syrup pumped will be 5.5 to 1 as explained more fully hereinbelow.

Although various different constructions are possible, in this embodiment, the working faces 69 and 69a are part-spherical to match part-spherical end walls 71 and 71a of the pumping chambers 53 and 53a, respectively. Also, the plunger 47 is integrally molded such that the plungers 55 and 55a are integral with each other and with the flange 45.

Considering next a preferred manner of using the water under pressure to reciprocate the piston 39, the water under pressure from the water inlet 27 (FIGS. 1 and 5) is directed by valve means 73 (FIG. 5) either to a chamber 75 or a chamber 77 (FIGS. 4 and 5) which communicate with the working faces 43 and 41, respectively, through identical passages 79 and 79a formed in the end housing sections 21 and 21a as shown in FIG. 4. The valve means 73 is in turn controlled by controlling means 81 (FIGS. 4 and 5) which is operated by the piston 39.

More specifically, the valve means 73 includes a linearly movable inlet valve element 83, a linearly movable exhaust valve element 85, dual valve seats 87 and 89 and dual valve seats 91 and 93 for the inlet and exhaust valve elements, respectively, and a connector 95 in the form of a rod for joining the valve elements for movement together. The valve elements 83 and 85 are mounted for movement in valve bodies 97 and 99, respectively, which are suitably retained within supporting structure 101 of the central housing section 19.

Figure 5:
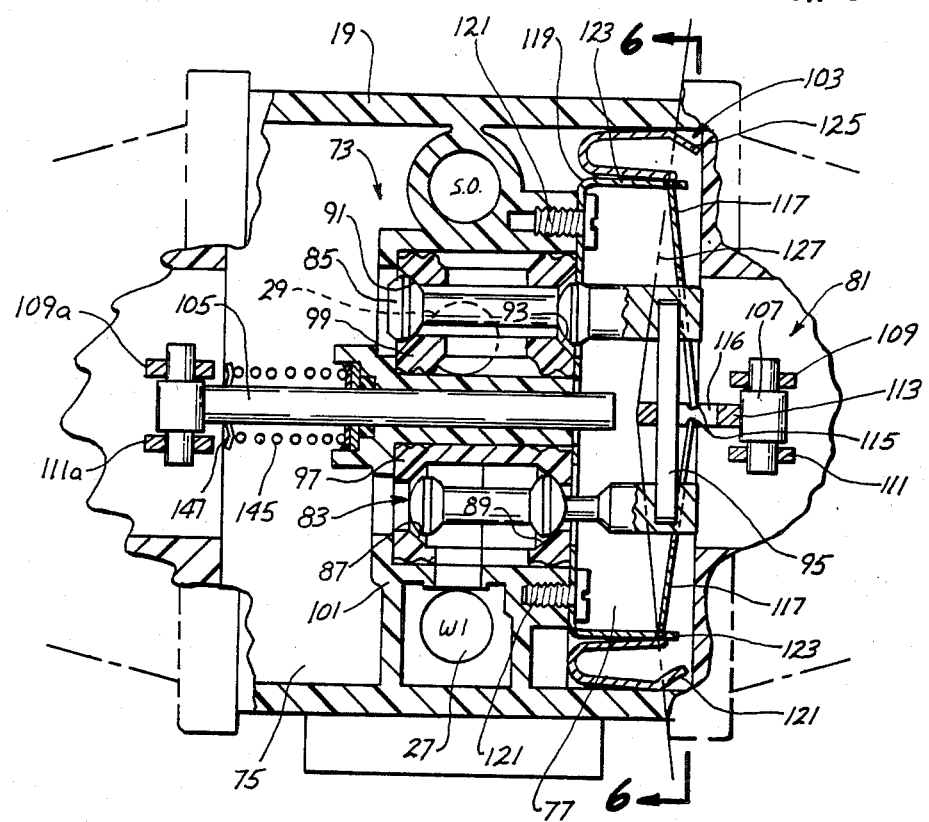
FIG. 5 is a fragmentary, sectional view taken generally along line 5—5 of FIG. 4.

With the valve means 73 in the position shown in FIG. 5, water at supply pressure can flow from the water inlet 27 past the valve seat 87 and through the chamber 75 and the passage 79a (FIG. 5) to the working face 43 to urge the piston 39 to the right as viewed in FIG. 4. In addition, the working face 41 communicates with the water outlet 29 through the passage 79, the chamber 77, the opening of the valve means at the valve seat 93 to the water outlet 29. Conversely, with the valve means 73 moved to the left from the position shown in FIG. 5, the piston 39 is driven in the other direction.

Figure 6:
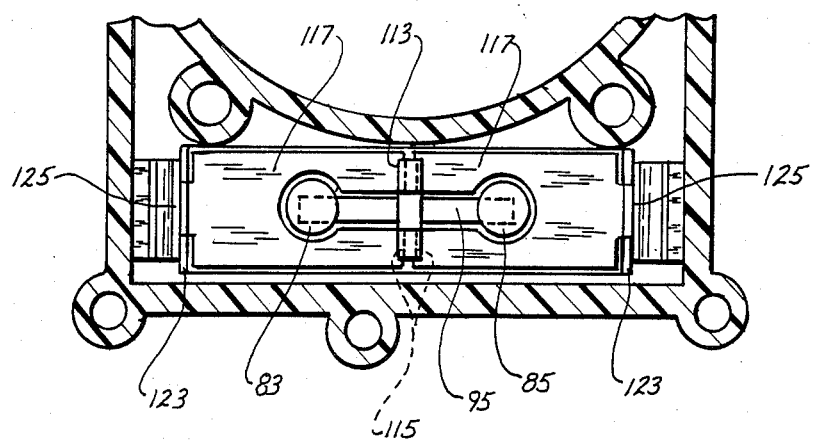
FIG. 6 is a fragmentary, sectional view taken generally along line 6—6 of FIG. 5.

Generally, the controlling means 81 includes bistable spring means 103 in the housing for operating the valve means 73 and driving means which, in this embodiment, includes a shaft 105, a collar 107 for driving the bistable spring means over center in both directions, and pivotally mounted levers 109, 109a, 111 and 111a (FIGS. 3 and 4) at opposite ends of the motor cylinder 37 which are pivotable by the piston 39 as it nears the ends of its strokes. Although the bistable spring means 103 can take different forms, in this embodiment, it includes a hinge member 113 (FIGS. 4 and 5) having recesses 115 in its opposite faces and an elongated slot 116 to slidably accommodate the connector 95 with some lost motion, longitudinally rigid arms 117 having their inner ends received within the recesses 115, respectively, a resilient, channel-shaped bracket 119 suitably joined to the supporting structure 101 as by screws 121 and having outwardly projecting resilient legs 123 with apertures for receiving the outer ends of the arms 117, respectively, and springs 125 urging the legs 123 inwardly and the arms 117 into the recesses 115. As best seen in FIG. 6, the arms 117 are bifurcated to provide clearance for the valve elements 83 and 85 and the connector 95. The bistable spring means 103 is a two-stage device which can be moved from the state shown in FIG. 5 over center to a position shown by phantom lines 127 by pushing the hinge member 113 to the left as viewed in FIG. 5. Conversely, the bistable spring means 103 can be returned to the full-line position for FIG. 5 by pushing the hinge member 113 to the right with the shaft 105.

Figure 3:
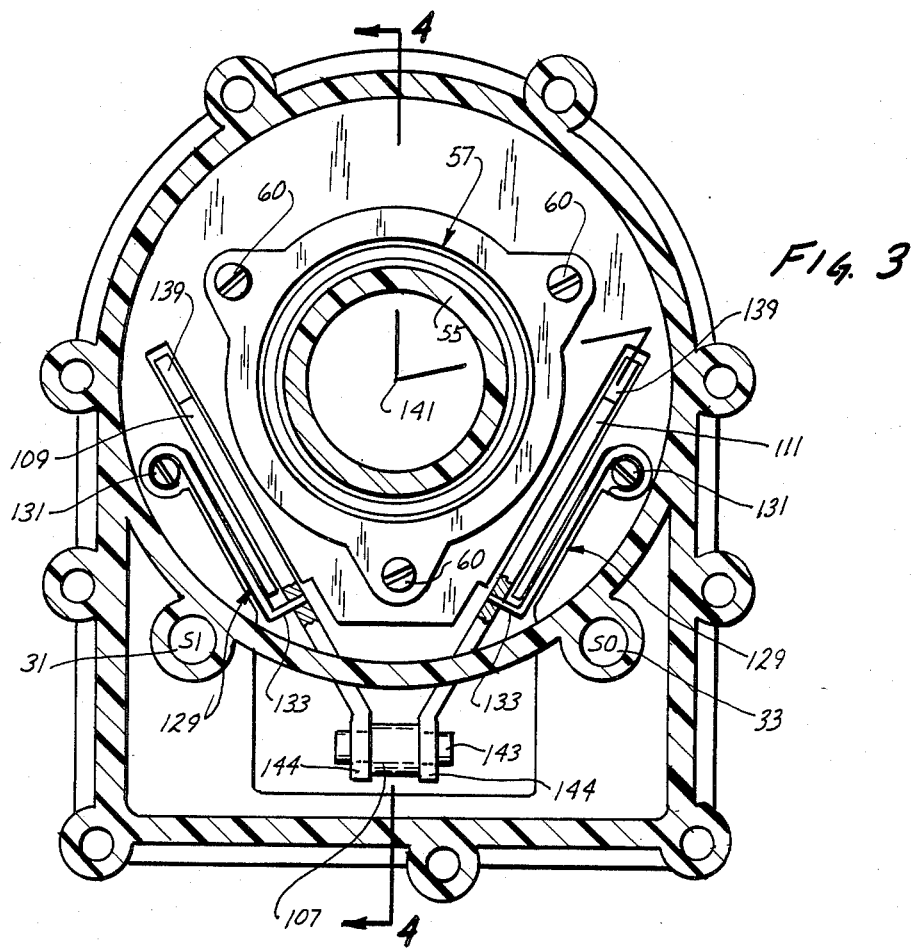
FIG. 3 is a sectional view taken generally along line 3—3 of FIG. 2, and more specifically, along line 3—3 of FIG. 4.

The levers 109 and 111 (FIGS. 3-5) cooperate to move the collar 107 when the piston nears the end of the cylinder 37 occupied by these levers. More specifically, each of the levers 109 and 111 is mounted by a resilient pin or wireform mounting member 129 attached to the associated end housing section 21 and 21a by a suitable fastener 131, with a resilient leg 133 of the pin being received in an associated opening located intermediate the ends of the associated lever. The levers 109, 109a, 111 and 111a are substantially identical, except that the levers 111 and 109a may be considered as righthand and the levers 111a and 109 as lefthand. As shown in FIG. 4, the lever 111 has a curved surface 135 adjacent to, but primarily on one side of, the leg 133. The curved surface 135 bears on a planar surface or abutment 137 formed on the housing section 21. One end of each of the levers 109-111a has a projection 139 (FIG. 4) engageable with the associated working faces 41 and 43. As shown in FIG. 3, the projections 139 engage the piston 39 on the opposite sides of the central axis 141 of the piston. The opposite ends of the levers 109 and 111 are joined together by a pin 143 which extends through tabs 144 (FIG. 3), with the major lengths of these levers extending at an acute angle relative to the pin axis. The pin 143 for the levers 109 and 111 is covered with the collar 107, and the pin 143 for the levers 109a and 111a is covered by a collar 107a.

The shaft 105 is mounted for sliding movement in the supporting structure 101. The shaft is biased to the left as viewed in FIGS. 4 and 5 by a return spring 145 which acts against a retaining ring 147 carried by the shaft. The shaft 105 extends completely through the supporting structure 101, and its opposite ends are engageable with the collar 107a and the hinge member 113. Thus, when the piston 39 travels to the extreme right as shown in FIG. 4, it will contact the projections 139 of the levers 109 and 111 and pivot them by causing the curved surfaces 135 to roll on the abutments 137 to pivot the levers clockwise as shown in FIG. 4. The rolling pivotal movement of the levers 109 and 111 is accommodated by the resilience of the wireform mounting members 129 and, in particular, the legs 133. Of course, pivoting of the levers 109 and 111 in this fashion drives the collar 107 and the hinge member 113 to the left to move the bistable spring means 103 over center to the position shown in phantom lines 127. Specifically, the connector 95 is engaged by the hinge member 113 after traveling the full length of the slot 116 to force the valve means 73 to its other position to bring about a reversal of the piston 39. The action at the opposite end of the cylinder 37 is similar when the working face 43 strikes the projection 139 of the levers 109a and 111a to pivot these levers in the same manner as described above. In this instance, these levers drive the collar 107a and the shaft 105 against the biasing action of the spring 145 to cause the shaft to move the hinge member 113 through center in the opposite direction back to the position shown in FIG. 4. Again, the connector 95 is moved by the hinge member 113 after the hinge member travels the full length of the slot 116 to switch the valve means 73 and reverse the piston 39.

The water from the water outlet 29 and the syrup from the syrup outlet 33 can be brought together within the housing 17 or outside of the housing. As shown by way of example in FIG. 1, these outlets are brought together outside of the housing 17 into a common receiver which includes a water conduit 149 leading from the water outlet 29, a syrup conduit 151 leading from the syrup outlet 33 and a common discharge conduit 153 which receives the delivery from both of the conduits 149 and 151. The dispensing of the beverage from the discharge conduit 153 can be controlled by a dispensing valve 155. The syrup conduit 151 extends from the syrup outlet 33 all the way to the discharge conduit 153, and there is no shutoff valve in the conduit 151 or in the pump housing 17 upstream of the conduit 151. Accordingly, the conduit 151 and the entire conduit from the there back to the outlet check valve 65 is incapable of shutting off flow of the syrup. If a valve were provided, for example, in the syrup discharge conduit 151, and if that valve were closed while the motor 13 were operating, the much higher discharge pressure of the syrup could overpressurize the pump and the delivery syrup conduits and bring about a failure.

The operation of the ratio pump 11 should now be apparent. With the valve 155 closed, the water exhaust from the motor 13 and the syrup delivery from the pump 15 are coupled into the closed conduit 153. Consequently, no differential pressure can be developed across the piston 39 and, no pumping takes place. However, when a beverage is demanded by opening of the valve 155 (FIG. 1), the conduit 153 opens to allow water under pressure from the water inlet 27 to drive the piston 39 while the water in the cylinder 37 from the previous stroke of the piston 39 is open to exhaust across the valve seat 93 to the conduits 149 and 153. Accordingly, the piston 39 moves to the left as shown in FIG. 2 and to the right as shown in FIG. 4 to exhaust the water in the cylinder 37. In addition, syrup previously drawn into the pumping chamber 53 is pumped through the outlet check valve 65 and the header 67 to the conduits 151 and 153. Simultaneously, movement of the plunger 55a to the left on its intake stroke draws syrup from the syrup inlet 31 into the pumping chamber 53a through the associated inlet check valve (not shown).

The volumes of water and syrup delivered are in a ratio established by the area of the working face 41 to the area of the working face 69. When the piston 39 nears the end of its stroke, its face 41 engages the projections 139 of the levers 109 and 111 to pivot them as described above to move the bistable spring means 103 over center and switch the position of the valve means 73. This causes the piston 39 to reverse and to repeat the action described above, except that the piston and plunger 47 travel in the opposite direction.

The motor 13 continues to operate for so long as the dispensing valve 155 is open. Demand operation is achieved without electrical wiring or a pressure switch. For example, the volume dispensed in a single stroke may be sufficient for a single drink.

With the construction described above, the beverage component ratio is fixed. However, the ratio can be changed to a new fixed ratio by replacing the seal glands 57 and 57a and the plunger sections 55 and 55a to provide new plunger sections 55 and 55a having a larger or smaller area.

Although an exemplary embodiment of the invention has been shown and described, many changes, modifications and substitutions may be made by one having ordinary skill in the art without necessarily departing from the spirit and scope of this invention.

We claim:

1. A ratio pump for providing first and second liquid components in a desired ratio wherein the first liquid component is pressurized, said ratio pump comprising:
   a motor including means defining a motor chamber, a reciprocable member reciprocable in the motor chamber, an inlet for admitting the first liquid component into the motor chamber to drive the reciprocable member with a predetermined volume of the first liquid component being used to drive the reciprocable member through at least one of its strokes, and exhaust for exhausting the first liquid component from the motor chamber, valve means for controlling the admission and exhaust of the first liquid component into and out of the motor chamber, respectively, and means for controlling the valve means so that the first liquid component can reciprocate the reciprocable member in the motor chamber;
   a pump including means defining a pumping chamber, a reciprocable pumping member reciprocable in the pumping chamber, an inlet for admitting the second liquid component into the pumping chamber, an outlet for discharging the second liquid component from the pumping chamber with each delivery stroke of the pumping member pumping a predetermined volume of the second liquid component;
   means for drivingly coupling the reciprocable members whereby the motor reciprocates the reciprocable pumping member;
   a receiver coupled to the exhaust of the motor to receive the first liquid component exhausted from the motor and the outlet of the pump to receive the second liquid component delivered from the pump whereby the receiver receives the first and second liquid components in the desired ratio; and
   said controlling means including bistable spring means for operating the valve means, a movable member for driving the bistable spring means over center in both directions, and first and second pivotally mounted levers at opposite ends of the motor chamber and pivotable by the reciprocable member of the motor as it nears the end of each stroke for moving the movable member whereby the bistable spring means operates the valve means.

2. A ratio pump as defined in claim 1 wherein said coupling means includes means for coaxially coupling the reciprocable members.

3. A ratio pump as defined in claim 1 wherein the reciprocable member of the motor has a working face on which the first liquid component acts and the reciprocable pumping member has a working face which acts against the second liquid component to pump the second liquid component, said working face of the reciprocable member of the motor having a larger area than the working face of the reciprocable member of the pump, said receiver includes first and second conduits leading from the motor exhaust and the pump outlet, respectively, and a common discharge conduit joined to both of the first and second conduits, said second conduit being incapable of shutting off flow of the second liquid component whereby the likelihood of a failure resulting from overpressurizing of the second conduit is reduced.

4. A ratio pump as defined in claim 1 wherein said pump includes a removable seal gland for sealingly cooperating with the reciprocable pumping member and said seal gland and reciprocable pumping member are replaceable to change said desired ratio.

5. A ratio pump for providing first and second liquid components in a desired ratio wherein the first liquid component is pressurized, said ratio pump comprising:
   a housing;
   means defining a motor chamber in said housing, a double-acting piston reciprocable in the motor chamber, an inlet for admitting the first liquid component into the motor chamber to drive the piston with a predetermined volume of the first liquid component being used to drive the piston through at least one of its strokes, an exhaust for exhausting the first liquid component from the motor chamber, valve means for controlling the admission and exhaust of the first liquid component into and out of the motor chamber, respectively, and means for controlling said valve means so that the first liquid component can reciprocate the piston in the motor chamber;
   means defining first and second pumping chambers in said housing, first and second reciprocable plungers coupled to the piston and reciprocated thereby in the pumping chambers, respectively, an inlet for admitting the second liquid component into the pumping chambers, an outlet for discharging the second liquid component from the pumping chambers whereby each delivery stroke of the plungers pumps a predetermined volume of the second liquid component;

a receiver coupled to the exhaust of the motor to receive the first liquid component from the motor and the outlet of the pump to receive the second liquid component from the pump whereby the receiver receives the first and second liquid components in the desired ratio; and said valve controlling means including bistable spring means in said housing for operating the valve means, a movable member on said housing for driving the bistable spring means over center in both directions, and first and second pivotally mounted levers at opposite ends of the motor chamber and pivotable by the piston as it nears the end of each stroke for moving the movable member whereby the bistable spring means operates the valve means.

6. A ratio pump as defined in claim 5 wherein said piston and plungers are coaxial and the pumping chambers are at opposite ends of the motor chamber.

7. A ratio pump as defined in claim 5 wherein said pump includes a removable seal gland for sealingly cooperating with the first plunger and said seal gland and said first plunger are replaceable to change said desired ratio.

8. A reciprocating device comprising:
a housing having a chamber therein;
a reciprocable member mounted in said chamber for reciprocating movement therein and having first and second working faces;
an inlet for admitting driving fluid under pressure to said chamber;
an exhaust for exhausting the driving fluid from the chamber;
valve means for controlling the admission and exhaust of the driving fluid into and out of the chamber, respectively;
controlling means for controlling the valve means so that the driving fluid can reciprocate the reciprocable member in the chamber; and
said controlling means including bistable spring means for operating the valve means and driving means for driving the bistable spring means over center in both directions, said driving means including first and second levers and means for pivotally mounting said first and second levers at opposite ends of the motor chamber so that the levers are pivotable by the reciprocable member as it nears the ends of its strokes whereby the valve means can be operated.

9. A reciprocable device as defined in claim 8 wherein said driving means includes a third pivotally mounted lever at the same end of the chamber as the first lever, said first and third levers engaging the reciprocable member on opposite sides of the axis thereof near the end of one of the strokes of the reciprocable member.

10. A reciprocable device as defined in claim 8 wherein said driving means includes an elongated shaft between the first lever and the bistable spring means and movable by the first lever to drive the bistable spring means over center in one direction.

11. A reciprocable device as defined in claim 8 wherein said bistable spring means includes a hinge member having first and second recesses therein, first and second arms having their inner ends receivable in the recesses and being movable with the hinge member over center between first and second states, spring means for urging the inner ends of the arms into the recesses, said driving means includes an elongated member drivingly engageable with said first lever and said hinge pin to move the hinge pin from one of the states thereof through the neutral position toward the other state thereof and a driving member drivable by the second lever and engageable with the hinge pin for driving the hinge pin from said other state over center toward said one state.

12. A reciprocable device as defined in claim 8 wherein said pivotal mounting means includes an abutment and a cooperating surface on the first lever engageable with the abutment and adapted to roll on the abutment to pivot said first lever.

13. A reciprocable device as defined in claim 12 wherein said pivotal mounting means includes a pin coupled to said first lever which is sufficiently resilient to accommodate the rolling movement of said first lever on the abutment.

* * * * *